United States Patent
Sieber et al.

(10) Patent No.: US 11,845,369 B2
(45) Date of Patent: Dec. 19, 2023

(54) UPHOLSTERY UNIT FOR A VEHICLE SEAT

(71) Applicant: Dr. Ing. h.c. F. Porsche Aktiengesellschaft, Stuttgart (DE)

(72) Inventors: Volker Sieber, Karlsbad (DE); Jochen Hofmann, Marktgraitz (DE); Katharina Wolfahrt, Ebersdorf (DE)

(73) Assignee: Dr. Ing. h. c. F Porsche AG, Stuttgart (DE)

( * ) Notice: Subject to any disclaimer, the term of this patent is extended or adjusted under 35 U.S.C. 154(b) by 0 days.

(21) Appl. No.: 17/854,414

(22) Filed: Jun. 30, 2022

(65) Prior Publication Data

US 2023/0001833 A1 Jan. 5, 2023

(30) Foreign Application Priority Data

Jun. 30, 2021 (DE) ...................... 10 2021 116 860.0

(51) Int. Cl.
*B60N 2/64* (2006.01)
*B60N 2/806* (2018.01)

(52) U.S. Cl.
CPC ............... *B60N 2/64* (2013.01); *B60N 2/806* (2018.02)

(58) Field of Classification Search
CPC .................................. B60N 2/64; B60N 2/806
USPC ...................... 297/284.2, 284.3, 284.4, 284.7
See application file for complete search history.

(56) References Cited

U.S. PATENT DOCUMENTS

| 4,773,703 | A | | 9/1988 | Kruegener et al. | |
|---|---|---|---|---|---|
| 5,370,444 | A | | 12/1994 | Stulik | |
| 5,520,438 | A | | 5/1996 | Stulik | |
| 5,659,910 | A | * | 8/1997 | Weiss | A61G 5/006 297/284.3 |
| 5,836,647 | A | * | 11/1998 | Turman | B60N 2/42745 297/284.3 |
| 6,557,937 | B1 | * | 5/2003 | Shah | A47C 7/028 297/284.3 |
| 6,663,178 | B2 | | 12/2003 | Fourrey et al. | |
| 2006/0255635 | A1 | * | 11/2006 | Iijima | B60N 2/643 297/284.3 |

FOREIGN PATENT DOCUMENTS

DE 29617091 3/1997

* cited by examiner

*Primary Examiner* — Anthony D Barfield
(74) *Attorney, Agent, or Firm* — Gerald E. Hespos; Michael J. Porco

(57) ABSTRACT

An upholstery unit (28) for a seat of a motor vehicle has bar-form upholstery elements (30) that can be displaced relative to one another and provide a person with cushioned support. A flexible connecting layer (32) connects the upholstery elements (30) to one another and can be folded into an interspace (34) between adjacent upholstery elements (30). The upholstery element (30) has at least one pocket (36), and at least one pressure-point actuator (38) is inserted in the pocket (36) of the upholstery element (30) to apply a massage pressure to the person through a material of the upholstery element (30). The pressure-point actuators (38) in the accommodating pockets (36) of the upholstery elements (30) can be displaced relative to one another. Thus, a massage function of the upholstery unit (28) is adapted optimally to people of different heights, and provides comfortable seating in a motor vehicle.

11 Claims, 2 Drawing Sheets

UPHOLSTERY UNIT FOR A VEHICLE SEAT

CROSS REFERENCE TO RELATED APPLICATION

This application claims priority under 35 USC 119 to German Patent Appl. No. 10 2021 116 860.0 filed on Jun. 30, 2021, the entire disclosure of which is incorporated herein by reference.

BACKGROUND

Field of the Invention

The invention relates to an upholstery unit for a seat of a motor vehicle and to a vehicle seat having such an upholstery unit to provide cushioned seating for a person in the vehicle seat.

Related Art

DE 296 17 091 U1 discloses a backrest of a seat for a motor vehicle. The backrest has a vibration device that can be tilted and adjusted in height.

EP 0 587 523 A1 discloses a length-adjustable seat cushion for a motor vehicle. Thick-walled foam regions of the cushion are connected to one another via thin-walled foam regions that can be folded in between following thick-walled foam regions.

There is a constant need to render seating in a motor vehicle as comfortable as possible.

An object of the invention is to provide comfortable seating in a motor vehicle.

SUMMARY

One aspect of the invention relates to an upholstery unit for a seat of a motor vehicle. The upholstery unit has bar-form upholstery elements that can be displaced relative to one another and are configured to provide a person with cushioned support. The upholstery unit has a flexible connecting layer that connects the upholstery elements to one another. The connecting layer can be folded into an interspace between two adjacent upholstery elements. The upholstery element has at least one accommodating pocket, and at least one pressure-point actuator is inserted in the accommodating pocket of the respective upholstery element. The pressure-point actuator is configured to apply a massage pressure to the person through a material of the upholstery element.

Plural pressure-point actuators can be used to provide a massage function for a vehicle seat having the upholstery unit. This massage function makes it possible to relieve muscle tension for a person sitting in the vehicle seat, such as muscle tension that occurs following a long period of travel spent sitting in a motor vehicle. Thus, seating in the vehicle seat is more comfortable.

The location of specified muscle groups of a person on a vehicle seat will vary in accordance with the height of the person. Thus, fixed pressure-point actuators can act at different points on the person's body and on different muscle groups depending on the person's height. Thus, seat comfort can be optimized by adapting a massage function of a pressure-point actuator to people of different heights. For example, the muscle areas of a person's back that are suitable for a particularly good massage effect are offset in height ("longitudinally in the frontal plane") for people of different heights, but hardly change at all in the transverse direction ("transversely in the frontal plane") in accordance with the height of the person. Therefore, displacement of the pressure-point actuators in the height direction of the vehicle seat is sufficient and can take place at the same time as a height adjustment of the vehicle seat in order to adapt the longitudinal extent of a backrest of the vehicle seat to the person's height. To achieve this, the upholstery element contains the accommodating pocket for the respective pressure-point actuator, and therefore an alteration in the spacing between the upholstery elements or an alteration in the centroids of the upholstery elements makes it possible to alter the spacing between the pressure-point actuators that are provided in the accommodating pockets of the various upholstery elements. Thus, the massage effect of the pressure-point actuators can be adapted in a specifically targeted manner.

An increasing interspace between the upholstery elements can be closed, and at least covered, by the connecting layer. Thus, the connecting layer is designed to be flexible enough so that, in a close-together relative position of the upholstery elements, the connecting layer can be folded automatically, into the interspace remaining between the adjacent upholstery elements. Use is made here of the finding that, if there is a number of upholstery elements sufficient for the desired massage effect, it is possible to select the width of the upholstery elements in the displacement direction to be large enough so that, in the end position with the largest interspaces between the adjacent upholstery elements, the interspace is still small enough to avoid the seat comfort being adversely affected. Sufficient support and cushioning for the person can still be ensured over the displacement region of the upholstery elements. The pressure-point actuators are inserted into the accommodating pockets of the upholstery elements and can be displaced in relation to one another so that a massage function of the upholstery unit provided in the vehicle seat can be adapted optimally to people of different heights to provide for comfortable seating in a seat of a motor vehicle.

The upholstery element of some embodiments is produced from a soft, compressible material, such as foam. Plural separate upholstery elements can be connected to one another via the connecting layer, preferably a common connecting layer, at a maximum distance defined by the connection to the connecting layer. For this purpose, the upholstery elements may be formed in an elongate manner, for example in the manner of a rod or a bar that may extend horizontally. When the upholstery elements are pushed together, the connecting layer can be folded into the interspace between the adjacent upholstery elements, thereby avoiding having the connecting layer protrude from the thickness region of the upholstery elements. The connecting layer can represent a cover and/or lamination of the upholstery elements. The side of the connecting layer, preferably a multi-ply connecting layer, that faces away from the upholstery elements can form a bearing surface for contacting the person sitting in the vehicle seat. The connecting layer thus forms an upper side of the upholstery unit, whereas the upholstery elements are provided on an underside of the upholstery unit. The accommodating pocket may be open in the direction of the underside, and therefore the pressure-point actuator can be fit into the upholstery unit from the underside. An upholstery unit material remains between the connecting layer and the pressure-point actuator that is fit in the accommodating pocket. The upholstery unit material has a thickness large enough to provide the person sitting in the vehicle seat with sufficiently comfortable cushioning. At the same time, this thickness is small enough to enable the pressure-point actuator to apply a pressure through the material of the upholstery unit and the connecting layer, and to the person sitting in the vehicle seat with the pressure being large enough to achieve a massage effect for the person. The accommodating pocket ensures that the material thickness of the upholstery unit is thin enough to ensure that the force applied by the pressure-point actuator is not distributed over an excessively large surface area. Accordingly, a comparatively small amount of energy is expended with a low design outlay to achieve a compressive force that stimulates the muscles of the person sitting in the vehicle seat. The pressure-point actuator can be configured, for example, in the form of an electrically or pneumatically actuatable piston and/or in the form of a vibration body. The components of the pressure-point actuator that can be moved relative to one another, make it possible for pressure to be applied at an adjustable frequency, briefly and repeatedly to the person sitting in the vehicle seat to produce a massage effect.

At least one pressure-point actuator assigned to an upholstery element may be connected to a displacement rail, and, in some embodiments, all of the pressure-point actuators assigned to an upholstery element are connected to displacement rails. The displacement rail is displaceable with respect to an adjacent upholstery element and/or with respect to a displacement rail assigned to the adjacent upholstery element. The displacement rail may be essentially rigid and non-compressible in comparison with the upholstery element. A comparatively high displacement force can easily act on the respective displacement rail to perform a length adjustment of the upholstery unit. In some embodiments, the at least one pressure-point actuator is connected to the displacement rail, but the upholstery unit is not connected to the displacement rail. The pressure-point actuator that is fastened to the displacement rail can be carried along when the displacement rail is displaced, and the pressure-point actuator strikes against the upholstery element within the accommodating pocket and thus automatically carries along the upholstery element. For the person sitting in the vehicle seat, this achieves length adjustment of the abutment surface formed by the upholstery element. For example, only the connecting layer and/or one of the peripheral upholstery elements are connected to one of the displacement rails to prevent the upholstery elements from lifting off from the pressure-point actuator. The number of points at which the upholstery elements and/or the connecting layer are fastened to the displacement rail can be smaller than the number of pressure-point actuators that are connected to the displacement rails, thereby keeping a low outlay relating to production and assembly.

Successive displacement rails may be coupled to one another for movement such that displacement of the displacement rails relative to one another forms an essentially identical spacing between respectively adjacent displacement rails. However, one displacement rail may be arrested in a fixed position. The displacement rails can be coupled to one another in a manner comparable to a slatted blind. It is possible to provide a travel-dependent movement-coupling means, for example a toothing formation, a scissors drive and/or some other type of transmission. In addition, or as an alternative, successive displacement rails can be coupled to one another via at least one spring element. Thus, the displacement rails can automatically assume an equilibrium position corresponding to the equilibrium of the spring forces acting on them. In particular, it is possible for precisely one upholstery unit and/or the connecting layer to be fastened in a fixed position in the displacement direction at a particular point, such as at a periphery of the upholstery unit. Accordingly, it is possible to ensure that the movement-coupled displacement rails are displaced in a kinematically determined manner relative to a defined reference position. Thus, the longitudinal extent of the upholstery unit can be adapted to a height of the person sitting in the vehicle seat, and the pressure-point actuators are displaced automatically to a position of the person's anatomy that is advantageous for a massage effect.

In some embodiments, the upholstery unit spreads out elastically when the displacement rails are displaced away from one another in the displacement direction. This makes it possible for the upholstery units to be configured in one piece and/or to be connected to one another, in particular on the underside. The upholstery units can be connected to one another, for example, essentially at a certain point or points or linearly. Therefore, when the displacement rails are displaced away from one another, the elastic deformation of the upholstery units outside the location at which the successive upholstery units are connected causes the upholstery units to expose between them an increasing interspace. The connecting layer then can be folded into the interspace when the upholstery units are moved toward one another.

The displacement rail can be displaced to a limited extent transversely to the displacement direction. This allows the massage action to be adapted transversely to a displacement direction corresponding to the longitudinal-adjustment direction of the upholstery unit, for example if the person is not sitting precisely in the middle of the vehicle seat. In addition, the limited transverse displacement capability of the displacement rails allows easier arching, forward and back, in the upholstery elements for the persons' lordosis when the upholstery unit is provided for massage and/or easing of the lordosis, in particular in the region of the cervical spine and/or of the lumbar spine.

The upholstery element of some embodiments has plural accommodating pockets spaced apart from one another over the material of the upholstery element. Additionally, the displacement rail assigned to the upholstery element may engage in a form-fitting manner in the material of the upholstery element in a region between the accommodating pockets by way of a protruding carry-along element. A plurality of pressure-point actuators provided for a specific upholstery element can be inserted respectively in accommodating pockets assigned to the respective pressure-point actuator. Thus, the material thickness of the upholstery element can be at a maximum between the accommodating pockets of adjacent pressure-point actuators of the same upholstery element and will not be reduced by an accommodating pocket. The material of the upholstery element can extend as far as the displacement rail, and therefore the at least one carry-along element can easily grip the material of the upholstery element and/or engage in a form-fitting manner in a corresponding depression. The carry-along element may engage around some of the material of the upholstery unit, so that this material of the upholstery unit projects in an undercut of the carry-along element. In this case, the upholstery unit can be drawn onto the displacement rail by the at least one carry-along element. The positioning of the upholstery unit thus can be harmonized very precisely with the position of the displacement rail. Even in the case of other forces acting on the upholstery units, the displacement of the displacement rail can force corresponding displacement of the associated upholstery unit.

In a maximally relieved state, the connecting layer is in a form in which it is folded into the interspace between two adjacent upholstery elements. Use is made here of the finding that the connecting layer, although flexible, has a certain amount of rigidity, and therefore the connecting layer can adopt a predetermined form in the relieved state. More particularly, in the relieved state, the connecting layer can project at least slightly concavely into the interspace between adjacent upholstery elements. When the adjacent upholstery elements move toward one another, the connecting layer can fold automatically into the interspace, thereby avoiding the situation where the connecting layer protrudes away from the material thickness of the upholstery elements, without significantly affecting the flexibility of the connecting layer to any adverse extent.

The connecting layer may be laminated to a person-facing upper side of the upholstery elements. The connecting layer may be fastened to the upper side and/or at least partially to a side surface that runs from the upper side to a rear side of the upholstery element. It is therefore possible for the connecting layer, in a smoothed-out state, to limit a maximum spacing between adjacent upholstery elements or the maximum size of the interspace between adjacent upholstery elements. In addition, it is possible to avoid a problematic air gap between the connecting layer and the upper side of the upholstery elements, in which case the force applied by the respective pressure-point actuator can better reach the person sitting in the vehicle seat.

A further aspect of the invention relates to a seat for a motor vehicle, having a seat cushion, a height-adjustable two-part backrest that is coupled to the seat cushion in a pivotable manner, and having a headrest coupled to the backrest in a tiltable and/or longitudinally adjustable manner. The seat cushion and/or the backrest and/or the headrest may have an upholstery unit that can be designed and developed as described above. The upholstery unit integrated in the seat cushion can massage the person's buttocks and thighs. The upholstery unit integrated in the backrest can massage the back muscles and/or the lordosis in the region of the lumbar spine. The upholstery unit integrated in the headrest can massage the lordosis in the region of the cervical spine depending on the dimensioning of the backrest and of the headrest. In addition, or as an alternative, the lordosis in the region of the cervical spine to be massaged by the upholstery unit integrated in the backrest. The pressure-point actuators that are inserted into the accommodating pockets of the upholstery elements can be displaced in relation to one another, make it possible for a massage function of the upholstery unit provided in the vehicle seat to be adapted optimally to people of different heights, thereby providing comfortable seating in a seat of a motor vehicle.

The backrest may have a lower part that is coupled to the seat cushion, and an upper part that is coupled to the headrest. The upper part is designed to be adjusted in length relative to the lower part. The upholstery unit of the backrest is connected both to the lower part and to the upper part. When the upper part of the backrest is displaced relative to the lower part of the backrest, in order to adapt the backrest to the height of the person sitting in the vehicle seat, the connection of the upholstery unit, on the one hand, to the lower part and, on the other hand, to the upper part of the backrest makes it possible, at the same time, for the massage function of the upholstery unit to be adapted automatically to the person's height. A separate adjustment mechanism for adjusting the length of the upholstery unit can thus be dispensed with.

The invention will be explained below, by way of example, with reference to the appended drawings and on the basis of preferred embodiments. The features presented below can individually and in combination represent an aspect of the invention.

DETAILED DESCRIPTION

Figure 1:
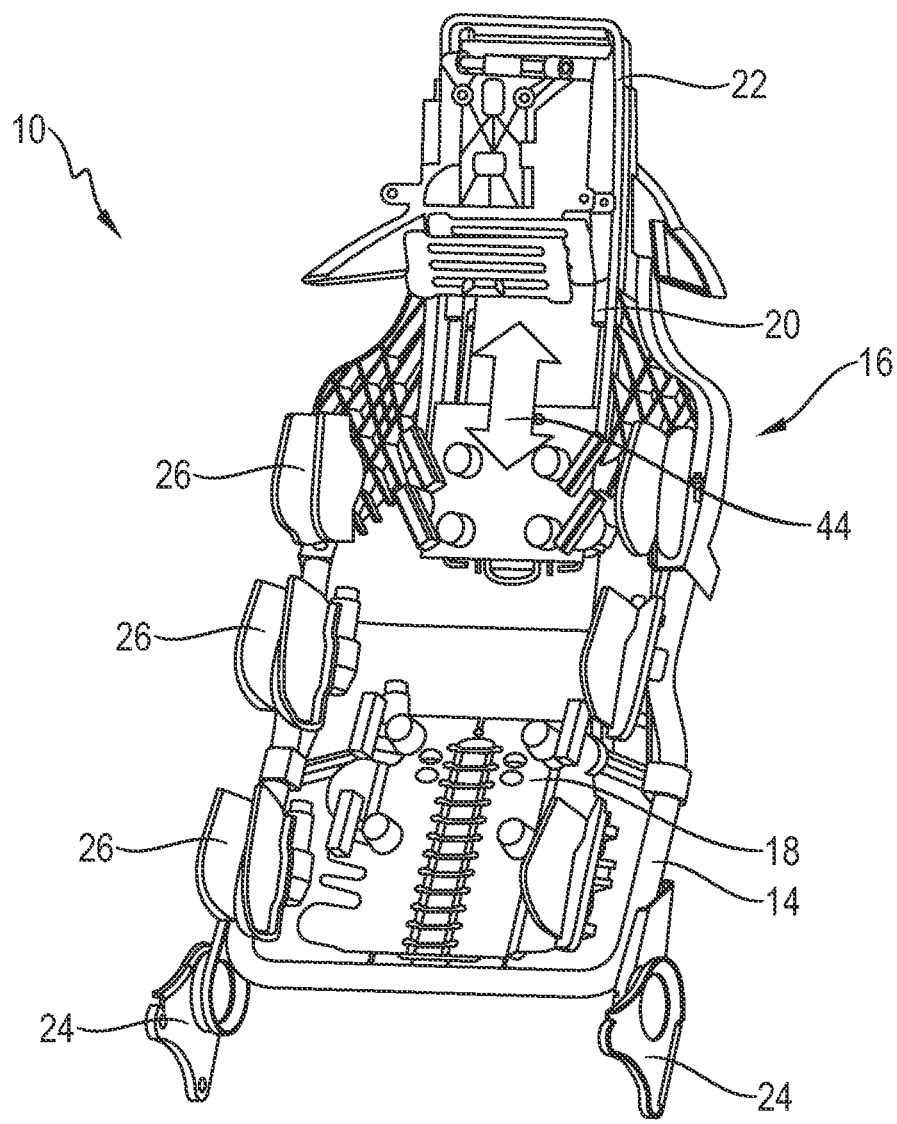
FIG. 1 is a schematic perspective view of a substructure of a vehicle seat.

The substructure 10 for a vehicle seat is illustrated in FIG. 1 and can be installed in a motor vehicle so that a driver or passenger can sit in the vehicle seat. The substructure 12 has a basic tubular frame 14 for a backrest 16. A lower part 18 is fastened in a fixed state to the basic tubular frame 14 and an upper part 20 is fastened thereto such that it can be displaced in the longitudinal direction of the backrest 16. A headrest 22 can be fastened to the upper part 20 of the backrest 16 such that it can be tilted and/or displaced in the longitudinal direction of the backrest 16. The backrest 16 is fastened pivotably via hinges 24 to a seat shell (not illustrated) for a seat cushion, and the seat shell can be inserted in a displaceable manner in seat rails of the motor vehicle. It is also possible for side bolsters 26 to be fastened to the backrest 16, preferably in a displaceable manner on the basic tubular frame 14, so that the person sitting in the vehicle seat is also supported laterally. The seat cushion, the headrest 22, the side bolsters 26 and/or the backrest 16 can have at least one upholstery unit 28 with a massage function.

Figure 2:
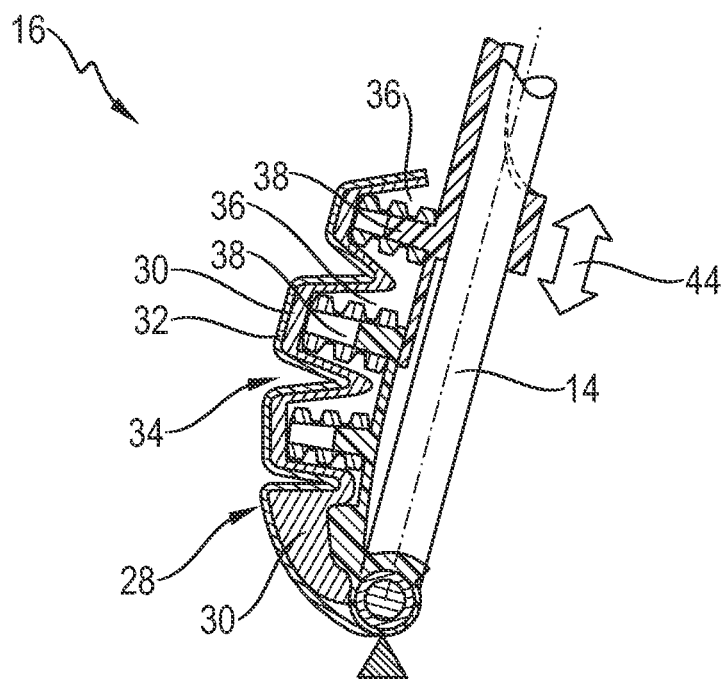
FIG. 2 is a schematic sectional view of an upholstery unit for the vehicle seat from FIG. 1, the upholstery unit being in a pushed-together state.
Figure 3:
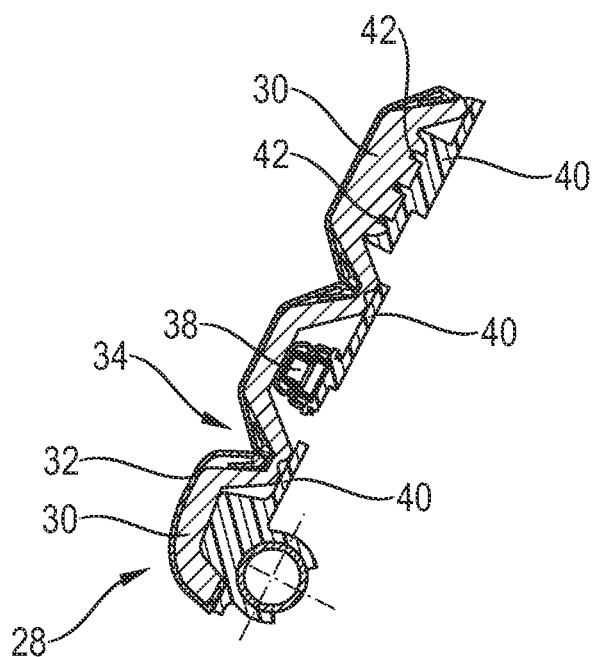
FIG. 3 is a schematic sectional view of the upholstery unit of FIG. 2 taken along an offset section plane, the upholstery unit being in a pushed-apart state.

FIGS. 2 and 3 illustrate an upholstery unit 28 for the backrest 16. The upholstery unit 28 can have a plurality of bar-form upholstery elements 30 that are connected to one another by a common connecting layer 32 that faces the person sitting in the vehicle seat. The connecting layer 32 can fold into an interspace 34 between successive upholstery elements 30. In the illustrated embodiment, the upholstery elements 30 are produced for example from a foam material, are formed in one piece and/or are connected to one another on an underside that faces the basic tubular frame 14. The upholstery elements 30 spread out elastically from the pushed-together state of the upholstery unit 28, as illustrated in FIG. 2, into the pushed-apart state of the upholstery unit 28, as illustrated in FIG. 3. The connecting layer 32 can be connected to the entire upper side of the upholstery elements 30, where the upper side faces away from the basic tubular frame 14, and also to the side surfaces of the upholstery elements 30, where the side surfaces face the interspace 34.

On their rear side, which faces away from the connecting layer 32, the upholstery elements 30 have accommodating pockets 36, in which at least one pressure-point actuator 38 can be inserted. The remaining material thickness of the upholstery element 30 and of the connecting layer 32 allows the pressure-point actuator 38 to apply a local force to the person sitting in the vehicle seat, and therefore the upholstery unit 28 can perform a massage function for a specific area of the person's body.

As can be seen, in FIG. 3, each upholstery element 30 is assigned a displacement rail 40, and these displacement rails are coupled for movement relative to one another and can draw the upholstery unit 28 apart in a displacement direction 44, when the upper part 20 of the backrest 16 is pushed away from the lower part 18 of the backrest 16 so that the vehicle seat to be adapted to a correspondingly greater height of the person sitting in the vehicle seat. For this purpose, the upholstery element 20 can have a lower end fixed to the lower part 18 and an upper end fixed to the upper part 20. The upholstery element 20 is connected, or at least coupled for movement, to the associated displacement rail 40 directly and/or indirectly via the respective pressure-point actuator 38. As a result, in the respective wholly or partially drawn-apart state of the upholstery unit 28, the interspaces 34 form an essentially identical spacing in relation to the successive upholstery elements 30. In regions of the upholstery element 30 in which there is no accommodating pocket 36 provided and the material of the upholstery element 30 extends as far as the displacement rail 40, the displacement rail 40 can engage in the material of the upholstery element 30, and catch in the upholstery element 30, by way of protruding carry-along elements 42, so as to establish a form-fitting connection.

What is claims is:

1. An upholstery unit for a seat of a motor vehicle, comprising:
   a plurality of bar-form upholstery elements (30) that can be displaced relative to one another and are configured to provide cushioned support for a person, the upholstery element (30) having at least one accommodating pocket (36);
   a flexible connecting layer (32) that connects the upholstery elements (30) to one another, the connecting layer (32) being foldable into an interspace (34) between two adjacent upholstery elements (30); and
   at least one pressure-point actuator (38) that is inserted in the accommodating pocket (36) of a respective one of the upholstery elements (30) and is operative for applying a massage pressure to the person through a material of the upholstery element (30).

2. The upholstery unit of claim 1, further comprising at least one displacement rail (40) that is connected to the at least one pressure-point actuator (38) and that is displaceable relative to an adjacent one of the upholstery elements (30).

3. The upholstery unit of claim 2, wherein the at least one pressure-point actuator (38) comprises plural pressure-point actuators (38) and the at least one displacement rail (40) comprises plural successive displacement rails (40) connected respectively to the pressure-point actuators (38), the displacement rails (40) being coupled for movement relative to one another such that displacement of the displacement rails (40) relative to one another forms an essentially identical spacing between adjacent displacement rails (40), and wherein precisely one displacement rail (40) is arrested in a fixed position.

4. The upholstery unit of claim 3, wherein the upholstery unit (30) spreads out elastically when the displacement rails (40) are displaced away from one another in a displacement direction (44).

5. The upholstery unit of claim 4, wherein the displacement rails (40) are selectively displaceable transverse displacement direction (44).

6. The upholstery unit of claim 3, wherein each of the upholstery elements (30) has an accommodating pocket (36), the accommodating pockets (36) being spaced apart from one another over the material of the upholstery elements (30), wherein the displacement rails (40) assigned respectively to the upholstery elements (30) engage in a form-fitting manner in the material of the upholstery element (30) in a region between the accommodating pockets (36) by way of a protruding carry-along element (42).

7. The upholstery unit of claim 1, wherein, in a maximally relieved state, the connecting layer (32) is folded into the interspace (34) between two adjacent upholstery elements (30).

8. The upholstery unit of claim 1, wherein the connecting layer (32) is laminated to a person-facing upper side of the upholstery elements (30), and the connecting layer (32) is fastened to the upper side and/or at least partially to a side surface that runs from the upper side to a rear side of the upholstery element (30).

9. The upholstery unit of claim 1, wherein the upholstery unit 1 has opposite front and rear surfaces, the upholstery elements (30) projecting forward at the front surface and the at least one accommodating pocket (36) being open in the rear surface, the flexible connecting layer (32) being on the front surface.

10. A seat for a motor vehicle, comprising: a seat cushion; a height-adjustable, two-part backrest (16) coupled to the seat cushion in a pivotable manner; and a headrest (22) coupled to the backrest (16) in a tiltable and/or longitudinally adjustable manner, at least one of the seat cushion, the backrest (16) and the headrest (22) has the upholstery unit (28) of claim 1.

11. The vehicle seat of claim 10, wherein the backrest (16) has a lower part (18) coupled to the seat cushion, and an upper part (20) coupled to the headrest (22), the upper part (20) being adjustable in length relative to the lower part (18), and the upholstery unit (28) of the backrest (16) is connected both to the lower part (18) and to the upper part (20).

* * * * *